US012784606B2

(12) United States Patent
Kim

(10) Patent No.: US 12,784,606 B2
(45) Date of Patent: Nov. 3, 2026

(54) LEARNING SUPPORT SYSTEM INCLUDING STATION FOR GROUP LEARNING

(71) Applicant: KOREA INSTITUTE OF ENERGY TECHNOLOGY, Naju-si (KR)

(72) Inventor: Kyung Kim, Naju-si (KR)

(73) Assignee: KOREA INSTITUTE OF ENERGY TECHNOLOGY, Naju-si (KR)

( * ) Notice: Subject to any disclaimer, the term of this patent is extended or adjusted under 35 U.S.C. 154(b) by 169 days.

(21) Appl. No.: 18/822,450

(22) Filed: Sep. 2, 2024

(65) Prior Publication Data

US 2025/0087106 A1 Mar. 13, 2025

Related U.S. Application Data

(63) Continuation of application No. PCT/KR2023/002861, filed on Mar. 2, 2023.

(30) Foreign Application Priority Data

Mar. 3, 2022 (KR) ........................ 10-2022-0027734
Apr. 1, 2022 (KR) ........................ 10-2022-0041187

(51) Int. Cl.
*G06Q 50/20* (2012.01)
*G09B 5/02* (2006.01)

(52) U.S. Cl.
CPC ............... *G09B 5/02* (2013.01); *G06Q 50/20* (2013.01)

(58) Field of Classification Search
CPC .................................. G09B 5/02; G06Q 50/20
See application file for complete search history.

(56) References Cited

U.S. PATENT DOCUMENTS 10,319,251 B2 * 6/2019 Martin .................. H04L 51/216

FOREIGN PATENT DOCUMENTS

KR 20-0246138 Y1 10/2001
KR 10-2013-0115484 A 10/2013
(Continued)

OTHER PUBLICATIONS

KR Office Action dated Jun. 21, 2022 as received in Application No. 10-2022-0041187.
(Continued)

*Primary Examiner* — Robert P Bullington
(74) *Attorney, Agent, or Firm* — CANTOR COLBURN LLP

(57) ABSTRACT

Proposed is a learning support system including a station for group learning. The learning support system includes an educational station configured to receive and output a professor's lecture material, or configured to receive and output discussion material, a screen placed at a preset location in a lecture room, and configured to output material forwarded from outside, a professor station configured to forward the lecture material to the educational station or the screen, or configured to output the lecture material or the discussion material for the professor to recognize, a client device configured to receive and output the lecture material, or configured to transmit the discussion material input by a student, and a management device configured to perform wired or wireless communication with the educational station, the screen, the professor station, and the learning device, and configured to enable material to be forwarded.

12 Claims, 15 Drawing Sheets

(56) References Cited

FOREIGN PATENT DOCUMENTS

| | | | |
|---|---|---|---|
| KR | 10-2016-0044315 | A | 4/2016 |
| KR | 10-2016-0066080 | A | 6/2016 |
| KR | 10-1667758 | B1 | 10/2016 |
| KR | 10-2021-0128221 | A | 10/2021 |

OTHER PUBLICATIONS

KR Decision to Grant Dated Sep. 1, 2022 as received in Application No. 10-2022-0041187.
KR Office Action dated Oct. 4, 2022 as received in Application No. 10-2022-0104728.
KR Office Action dated Jan. 2, 2023 as received in Application No. 10-2022-0104728.
KR Decision to Grant Dated Mar. 16, 2023 as received in Application No. 10-2022-0104728.
International Search Report dated Jun. 13, 2023 as received in Application No. PCT/KR2023/002861.

* cited by examiner

FIG. 11

●● Lecture Information

| | | | |
|---|---|---|---|
| Class | Class | Year/Semester | 2022-1st semester |
| No.of Students | No.of Students | Class Time | Monday 06:30~10:00 |

●● Student Information

| # | Student ID | Name | Department | Email | Total no. of feedback | Participation Rate |
|---|---|---|---|---|---|---|
| 1 | 20212222222 | AAA | Energy Engineering | AAA@kentech.ac.kr | 3 | 8.42% |
| 2 | 2022231411111 | BBB | Energy Engineering | BBB@kentech.ac.kr | 2 | – |
| 3 | 20221425 | CCC | Energy Engineering | CCC@kentech.ac.kr | 0 | – |
| 4 | 20221611 | DDD | Energy Engineering | DDD@kentech.ac.kr | 3 | – |

LEARNING SUPPORT SYSTEM INCLUDING STATION FOR GROUP LEARNING

CROSS REFERENCE TO RELATED APPLICATION

The present application claims priority to Korean Patent Application No. 10-2022-0027734, filed Mar. 3, 2022, Korean Patent Application No. 10-2022-0041187, filed Apr. 1, 2022, and PCT Application No. PCT/KR2023/002861, filed Mar. 2, 2023, the entire contents of which is incorporated herein for all purposes by this reference.

BACKGROUND

Field

The following description relates a learning support system including a station that enables active group learning.

Description of the Related Art

A conventional typical lecture is held as follows.

A professor distributes lecture material to be used in a lecture, online/offline, and students print out the lecture material as documents or the professor outputs the lecture material on a screen in the lecture room to give the lecture.

A conventional lecture is based on lecture material, and a professor only delivers lecture content one-way, and students have difficulty in communicating with the professor or communication between the students is difficult during the lecture. Thus, the students can ask questions or give feedback about the lecture content in a separate offline meeting after the lecture is finished.

However, learning efficiency of this one-way lecture is highly dependent on the students' degrees of concentration and variation in learning ability, and it is difficult to encourage active participation of all the students.

Therefore, there is a need for a lecture system that facilitates smooth communication between a professor and student, and between students during a lecture and improves learning efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a learning support system including a station for group learning includes: an educational station configured to receive and output a professor's lecture material, or configured to receive and output discussion material; a screen placed at a preset location in a lecture room, and configured to output material forwarded from outside; a professor station configured to forward the lecture material to the educational station or the screen, or configured to output the lecture material or the discussion material for the professor to recognize; a client device configured to receive and output the lecture material, or configured to transmit the discussion material input by a student; and a management device configured to perform wired or wireless communication with the educational station, the screen, the professor station, and the learning device, and configured to enable material to be forwarded.

BRIEF DESCRIPTION OF THE DRAWINGS

FIG. 11 shows an example of a process in which a professor station manages each of the students' degrees of learning.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
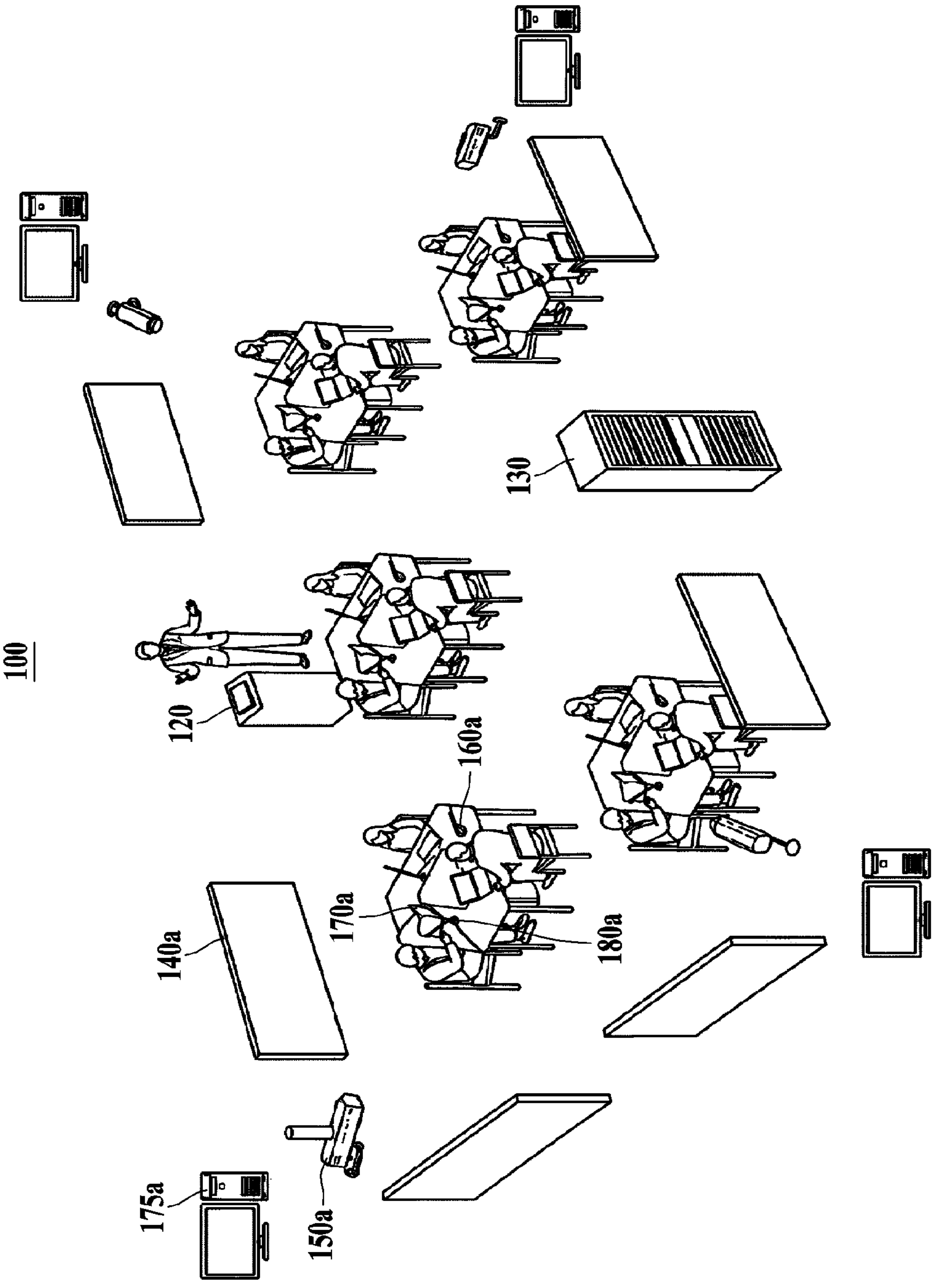
FIG. 1 illustrates an example of a plan view of a structure of a learning support system.

A variety of modifications may be made to the present disclosure and there are various embodiments of the present disclosure, particular embodiments of the present disclosure are illustrated in the drawings and will be described in detail. However, the present disclosure is not limited thereto, and the exemplary embodiments can be construed as including all modifications, equivalents, or substitutes in a technical concept and a technical scope of the present disclosure.

Terms "first", "second", "A", and "B" can be used to describe various elements, but the elements are not to be construed as being limited to the terms. The terms are only used to differentiate one element from the other elements. For example, a "first" element may be named a "second" element without departing from the scope of the present disclosure, and similarly, a "second" element may also be named a "first" element. The term "and/or" includes a combination of a plurality of items or any one of a plurality of terms.

In the terms used herein, an expression used in the singular encompasses the expression of the plural, unless the context clearly means otherwise. It will be furthermore understood that the terms "comprises", "comprising", "includes", and "including" specify the presence of stated features, numbers, steps, operations, elements, components, or combinations thereof, but do not preclude the presence or addition of one or more other features, numbers, steps, operations, elements, components, or combinations thereof.

Before providing a detailed description of the drawings, it would be clarified that the division of elements in the present disclosure is merely a division according to main functions each element is responsible for. That is, two or more elements, which will be described below, may be combined into one element, or one element may be divided into two or more parts for more detailed functions. In addition to the main functions that each element is responsible for, each of the elements may additionally perform some or all of the functions that the other elements are responsible for. Some of main functions each element is responsible for may be handled and performed by the other elements.

In addition, in performing a method or an operation method, steps constituting the method may occur in an order different from an order described herein unless a specific order is clearly stated in context. In other words, the steps may be performed in the same order as described, may be performed substantially simultaneously, or may be performed in the reverse order.

FIG. 1 is a plan view illustrating a structure of a learning support system according to an embodiment of the present disclosure.

Referring to FIG. 1, a learning support system 100 according to an embodiment of the present disclosure includes an educational station 110, a professor station 120, a management device 130, a screen 140, a video capture unit 150, a wireless adapter 160, and a client device 170, 175. In addition, the learning support system 100 may further include a microphone 180.

The learning support system 100 outputs a professor's lecture material to students, and also allows the students' own materials to be shared with other students or the professor for discussion. As described above, the learning support system 100 may improve learning efficiency by enabling individuals to freely share materials they want to learn or debate, and to have a discussion about.

In addition, when the students learn lecture material with their learning devices 115, 170, the learning support system 100 analyzes and provides the degrees of learning of the students to the professor. Accordingly, the learning support system 100 enables the professor to determine how well each of the students is learning and following the lecture.

The educational station 110 receives the professor's lecture material, other materials, or discussion material from the management device 130 and outputs the same. The management device 130 may provide data required for the learning support system 100 and may perform control. The management device 130 may be realized as a device, such as a PC or a server.

The educational station 110 includes displays of which the number is equal to or less than the number of persons belonging to each group. The educational station 110 outputs other materials provided by the professor or discussion material provided by a student to enable each person or some persons in a group to view the materials in addition to their own learning devices 170. Accordingly, the educational station 110 enables each of the students to learn lecture material using the professor's lecture and his or her own client device 170, and enables discussion to be held between the students or between the student and the professor. The educational station 110 adjusts the positions of the displays depending on whether a lecture is held or discussion between the students is held, thereby enabling the students to take the lecture or have the discussion optimally. The educational station 110 will be described in detail later with reference to FIGS. 2 and 3.

The professor station 120 provides each educational station 110 or the screen 140 with other materials required for the lecture or the lecture material of the lecture that the professor is going to give, or outputs the other materials, the lecture material, and discussion material provided by a student to the professor station so that the professor recognizes the materials.

The professor station 120 provides other materials or lecture material to each educational station 110 or the screen 140 via the management device 130. The professor station 120 may receive other materials or lecture material from the professor via the professor's terminal, and may output the same to each educational station 110 or the screen 140 via the management device 130 (under the control of the professor). In the meantime, the professor station 120 may receive discussion material from the educational station 110 via the management device 130.

The professor station 120 outputs other materials, lecture material, and discussion material for the professor to recognize. The professor station 120 outputs other materials and lecture material for the professor to recognize the materials and give the lecture smoothly. In the meantime, the professor station 120 outputs discussion material so that the professor understands a topic that a student wants to discuss. The professor station 120 will be described in detail later with reference to FIG. 4.

The management device 130 may communicate with each educational station 110, professor station 120, screen 140, video capture unit 150, wireless adapter 160, and client device 175 in a wired/wireless manner to control the operation of each element. In the meantime, the management device 130 receives student feedback from the learning devices 170, 175 and analyzes the degrees of learning of the students.

The management device 130 communicates with each educational station 110, the professor station 120, and the screen 140 in a wired or wireless manner, and forwards required material from a particular element to another. The management device 130 is connected to each educational station 110 and the professor station 120, usually within the lecture room in a wired manner (or may be connected in a wireless manner), and transmits and receives lecture material, other materials, or discussion material from one element to another. In the meantime, the management device 130 outputs each piece of material to the screen 140 under the control of the professor station 120.

The management device 130 communicates with the video capture unit 150 in a wired or wireless manner, communicates with a client device 175 in a wireless manner, and forwards a video obtained by the video capture unit 150 to the client device 175 or receives data forwarded from the client device 175. The video capture unit 150 is a camera device placed in the lecture room, and may include an image sensor device, and a transceiver for transmitting a video over a network. The management device 130 receives a video obtained by the video capture unit 150 from the video capture unit 150 and forwards the video to a client device 175. Accordingly, a client device 175 may be aware of lecture content or discussion content remotely outside of the lecture room on the basis of a video obtained by the video capture unit 150.

The management device 130 receives student feedback from the learning devices 170, 175 and analyzes the degrees of learning of the students. The students use the learning devices 170, 175 to provide feedback during the lecture using emojis, or to provide opinions on the lecture content during or after the lecture. Furthermore, the management device 130 receives a video of a student obtained by a client device 170, 175 from the client device 170, 175, and analyzes the student's degree of concentration on the lecture from the video. The management device 130 analyzes the degree of learning of each of the students on the basis of the feedback, the opinions, or the degrees of concentration of the students. The management device 130 will be described in detail with reference to FIG. 5.

The screen 140 outputs data forwarded through the management device 130. The screen 140 is placed at a preset location (usually, on a wall) in the lecture room, and outputs lecture material, other materials, or discussion material forwarded through the management device 130. The screen 140 may be realized as a device that outputs a video directly, or may be realized as a device that receives an incoming video from an external device (not shown) outputting the incoming video and outputs the incoming video.

One or more video capture units 150 are placed at preset locations in the lecture room, and capture the professor or the screen 140. A video capture unit 150 captures the inside of the lecture room so that students who are not present in the lecture room understand the lecture content on the basis of the learning devices 175. A video capture unit 150 is usually placed at a corner of the ceiling of the lecture room and captures the professor forwarding the lecture content or the screen 140 outputting lecture material or discussion material. A video capture unit 150 forwards the captured material to the management device 130, so that the management device 130 forwards the filmed video to a client device 175.

The wireless adapter 160 enables wireless communication to be performed between a client device 170 and the management device 130. As described above, depending on a case, a student may have a discussion issue, which he or she wants to discuss, arising from the lecture content. Thus, the student needs to transmit discussion material that he or she wants to discuss with his or her client device 170, to the professor station 120, the educational station 110, or the screen 140. The wireless adapter 160 is attached on a client device 170, forms a wireless network with the management device 130, and enables the client device 170 to transmit data to the management device 130 in a wireless manner. A representative example of realizing the wireless adapter 160 is a Bluetooth dongle. The wireless adapter 160 is attached on a client device 170 so that the client device 170 transmits data intended to be transmitted, to the management device 130 through Bluetooth communication. One or more wireless adapters 160 are placed within each educational station 110 to enable a student to share discussion material within his or her client device 170 when necessary.

A client device 170 receives and outputs lecture material or other materials, and captures a student or receives feedback from a student and forwards the same to the management device 130.

A client device 170, 175 receives and outputs lecture material or other materials. A client device 170, 175 receives lecture material from the management device 130 or receives lecture material from other external terminals, and outputs the lecture material so that a student recognizes the lecture material. In addition, a client device 170, 175 receives other materials from the management device 130 (usually, during the lecture) and outputs the other materials. In the meantime, a client device 170 may receive input from a student and may forward discussion material to the management device 130 via a wireless adapter 160.

A client device 170, 175 captures a student or receives feedback from a student and forwards the same to the management device 130. A client device 170, 175 captures a student, regardless of outputting the above-described material. A client device 170, 175 captures a student so that the management device 130 determines the student's degree of learning. In addition, a client device 170, 175 may output lecture material or other materials, and may receive an emoji or an opinion from a student as feedback. A client device 170, 175 uses a wireless adapter to forward a video obtained by the management device 130 and feedback.

In the meantime, a client device 175 receives and outputs a video obtained by a video capture unit 150 from the management device 130, and may output the professor's lecture content to a student who uses the client device 175. Accordingly, at a remote location, a student may use a client device 175 to take the professor's lecture content.

One or more microphones 180 are placed at each educational station 110, and amplify a student's voice. Usually, a microphone 180 amplifies, when a student wants to share discussion material and hold discussion, the student's voice to forward the student's opinion smoothly within the lecture room.

Figure 2:
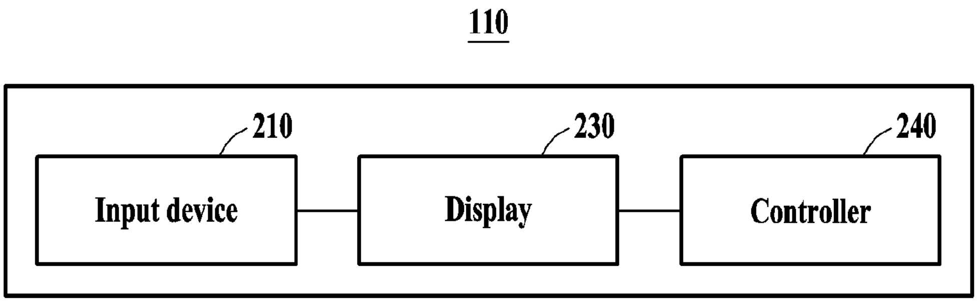
FIG. 2 illustrates an example of a configuration of an educational station.
Figure 3A:
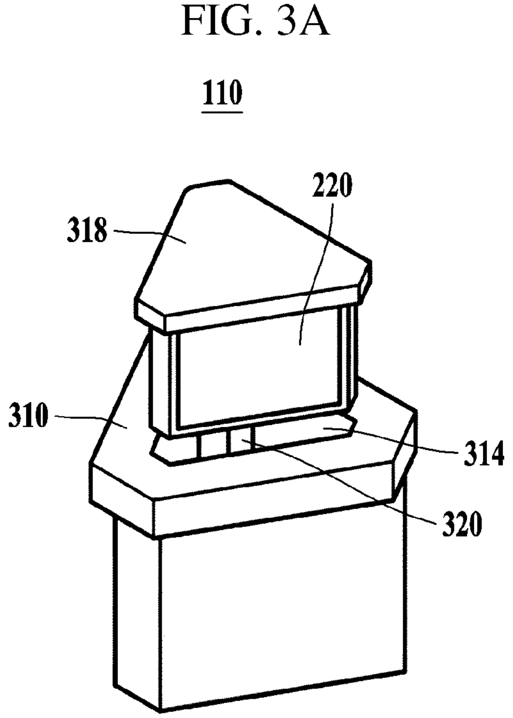
FIGS. 3A-3C illustrate an example of a structure of an educational station.
Figure 3B:
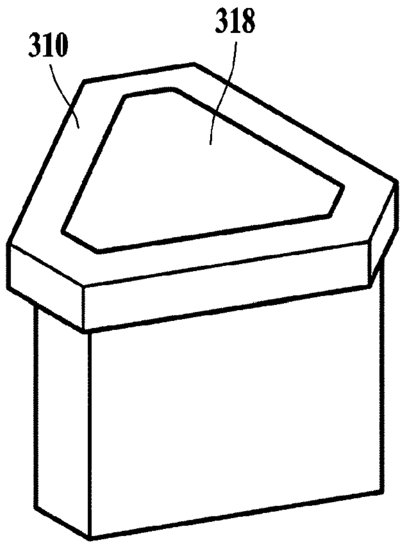
Figure 3C:
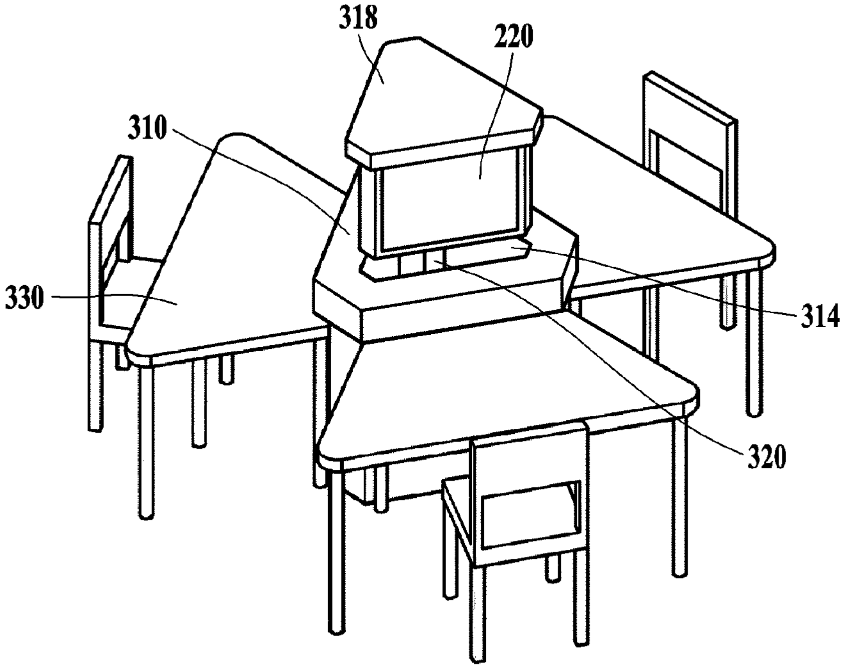

FIG. 2 is an example illustrating a configuration of an educational station. FIGS. 3A-3C illustrate an example of a structure of an educational station.

Referring to FIGS. 2, 3A, and 3B, an educational station 110 according to an embodiment of the present disclosure includes an input device 210, a display 220, a controller 230, a body 310, a through hole 314, a cover 318, a support 320, and a lifting/lowering device (not shown).

The input device 210 receives lecture material or other materials from the management device 130. The input device 210 performs wired/wireless communication with the management device 130, and receives lecture material or other materials from the management device 130. The input device 210 may include a communication module for receiving data or an interface device for receiving data into the input part.

The input device 210 receives discussion material from the management device 130. The management device 130 may receive discussion material from a client device 170 via a wireless adapter 160. The input device 210 receives discussion material from the management device 130.

The input device 210 may receive a control signal for lifting/lowering a display 220 from the management device 130.

A display 220 outputs appropriate material under the control of the controller 230. Displays 220 of which the number is equal to or less than the number of persons included in a group are included, and output material. As many displays 220 may be included as there are persons included in a group. Alternatively, a particular number of persons are set as a small group and one display 220 is assigned to each small group such that displays of which the number is less than the number of persons included in a group may be included. For example, when the number of persons belonging to a group is six, six displays 220 may be included, or three displays may be included with two (which may be variable) people as one small group.

The controller 230 controls, on the basis of whether the input device 210 has received material, the operation of a display 220 and the lifting/lowering device (not shown).

When the input device 210 receives lecture material or other materials from the management device 130, the controller 230 controls a display 220 and the lifting/lowering device (not shown) to output the received material. In order to output lecture material or other materials to a display 220, the controller 230 controls the lifting/lowering device (not shown) such that the display 220 is lifted to a height at which the entire area thereof is exposed to the outside of a desk 310, and controls the display 220 to output the material.

When the input device 210 receives discussion material from the management device 130, the controller 230 controls a display 220 and the lifting/lowering device (not shown) such that the display 220 outputs the discussion material.

When a control signal for lowering a display 220 is received from the professor station 120 or the management device 130, the controller 230 controls the lifting/lowering device (not shown) such that the display 220 is lowered.

As described above, lifting/lowering a display 220 may have the following effects. With a display 220 lowered, the students may have a face-to-face debate between them at one desk 310. Accordingly, the degrees of concentration on debate between the students may be improved, and the exchange of opinions between the students may improve learning efficiency. In the meantime, with a display 220 lifted, the students may view lecture material or other materials, and may share discussion material with each other or share the same with other student groups. Since material may be easily shared with each other, the amount of material that each of the students is able to obtain from the class may increase. As described above, as a display 220 is lifted/lowered when necessary, the educational station 110 may improve the students' degrees of concentration on debate, and may encourage the students to actively share material and make a presentation, resulting in active learning.

The through hole 314 may be formed in the body 310, at least as large as the entire area of a display 220, to allow the display 220 to be lifted/lowered between the inside of the body 310 and the outside of the body 310. A display 220, the support 320, and the lifting/lowering device (not shown) are placed in the through hole 314, such that the display 220 is lifted to the outside of the body 310 or lowered and is placed within the space enclosed by the body 310 within the body 310 so as not to be exposed to the outside. Thus, as described above, when use of a display 220 is not required, such as debate between the students is held, the display 220 is placed in the through hole 314 and may thus not interfere with debate between the students and may be protected from being damaged by external forces.

The cover 318 having the area that is equal to the area of the through hole 314 or has an error within a present range is placed on the top of a display 220. The cover 318 on the top of a display 220 is realized as having the area that is equal to the area of the through hole 314 or has an error within a present range, so may not affect the lifting/lowering of the display 220 and may be placed on the top of the display 220. When a display 220 is placed in the through hole 314, the cover 318 may prevent the display 220 from being exposed to the external environment vertically above itself.

A display 220 with the cover 318 on the top may be lowered into the through hole 314 to a height that is equal to the height of the body 310 adjacent to the cover 318 or has an error within a preset range therefrom. When a display 220 is lowered into the through hole 314, the top of the body 310 and the cover 318 may form a plane, enabling a student to use the top of the educational station 110 for various purposes, such as a desk.

The cover 318 may be realized using the same material as the body 310. As described above, when a display 220 is lowered, the body 310 and the cover 318 may form a plane. Herein, in order to minimize the sense of heterogeneity that a student may feel from the cover 318, the cover 318 may be realized with the same material as the body 310.

The support 320 supports a display 220 to enable the display 220 to be lifted/lowered by the lifting/lowering part.

In supporting displays 220, the support 320 may place and support the displays 220 in a polygonal shape having as many sides as there are displays 220. Herein, the support 320 supports displays 220 such that the output screens of the displays 220 face the outside (in directions in which the displays do not face each other). When displays 220 are placed in a polygonal shape, each person or small group included in the group may view an output screen without inconvenience and the displays 220 (as a whole) may occupy the smallest area. However, without being limited thereto, the support 320 may support displays 220 in various shapes or forms, in placing and supporting the displays.

Enabling displays 220 to be lifted/lowered by the lifting/lowering device (not shown), the support 320 includes a column (not shown) for supporting the weight of the displays 220, and arms (not shown) protruding from the column to fix the respective displays 220 to the column. As many arms (not shown) protrudes from the column (not shown) as there are displays 220, in order to fix the respective displays 220.

The lifting/lowering device (not shown) lifts or lowers the support 320. Accordingly, a display 220 may be lifted (with the lifting of the support 320) or lowered (with the lowering of the support 320) by the lifting/lowering device (not shown).

In the meantime, as shown in FIG. 3C, a desk 330 may be placed touching or adjacent to the educational station 110. As many desks 330 may be placed as there are displays 220, and may be placed touching or adjacent to the educational station 110 in directions in which the output screens of the respective displays 220 face. Accordingly, a student may place his or her client device 170 at a desk 330, and may view the material output on a display 220. A desk 330, as a separate element, may be placed touching or adjacent to the educational station 110. Alternatively, a desk 330, as an integrated element with the educational station 110, may be placed touching or adjacent to the educational station 110.

FIG. 3 shows an integrated-type display 220 of which multiple display devices are placed on different surfaces. However, depending on a case, a display 220 may be as multiple display devices (output screens) individually. In this case, the multiple display devices may be individually placed on the support and lifted or lowered.

Figure 4:
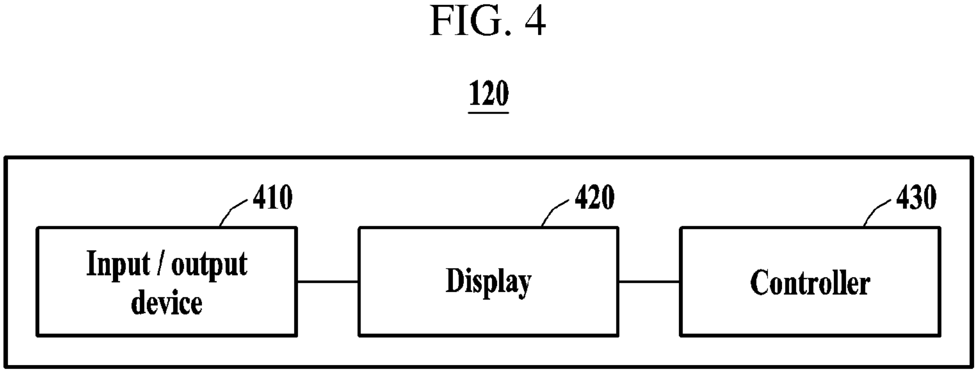
FIG. 4 illustrates an example of a configuration of a professor station.

FIG. 4 shows an example of a configuration of a professor station.

Referring to FIG. 4, a professor station 120 according to an embodiment of the present disclosure include an input/output device 410, a display 420, and a controller 430.

The input/output device 410 transmits lecture material or other materials to the management device 130, or receives discussion material from the management device 130. The input/output device 410 performs wired/wireless communication with the management device 130, and transmits lecture material or other materials to or receives discussion material from the management device 130

The input/output device 410 may transmit a control signal for lowering a display 220 to the management device 130.

Further, the input/output device 410 may receive each of the students' degrees of learning from the management device 130.

The display 420 outputs lecture material or other materials, or outputs received discussion material for the professor to recognize the materials.

Further, the display 420 may output the received degree of learning of each of the students.

The controller 430 controls the operation of the input/output device 410 and the display 420.

Figure 5:
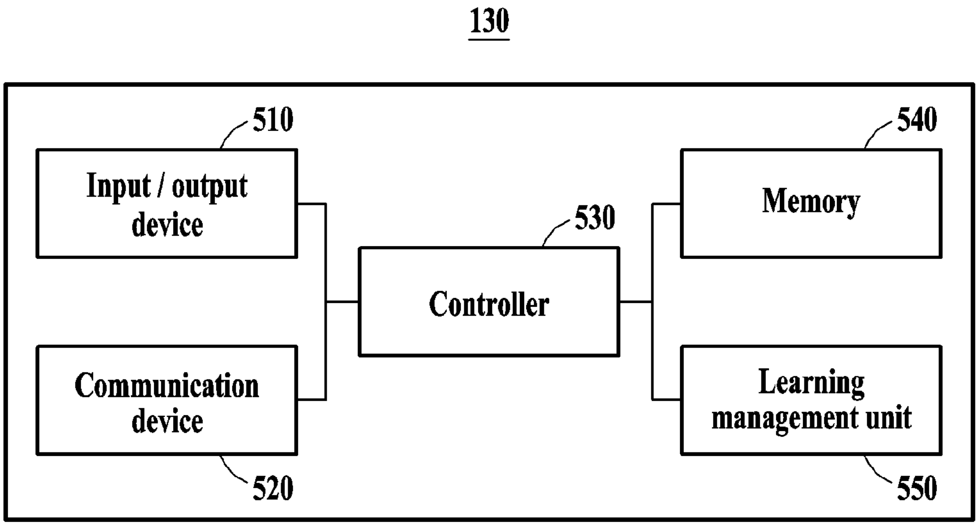
FIG. 5 illustrates an example of a configuration of a management device.

FIG. 5 shows an example of a configuration of a management device.

Referring to FIG. 5, a management device 130 according to an embodiment of the present disclosure includes an input/output device 510, a communication device 520, a controller 530, a memory 540, and a learning management unit 550.

The input/output device 510 enables each piece of material to be input/output between the educational station 110, the professor station 120, and the screen 140. The input/output device 510 receives lecture material or other materials from the professor station 120, and forwards the same to the educational station 110 or the screen 140. In the meantime, the input/output device 510 forwards discussion material received from the educational station 110 to another educational station 110, professor station 120, or screen 140.

The input/output device 510 may receive a control signal for a learning mode from the professor station 120. The input/output device 510 may receive a control signal for a lecture mode along with lecture material or other materials from the professor station 120. On the other hand, the input/output device 510 may receive a control signal for a discussion mode without receiving any material from the professor station 120.

The communication device 520 enables each piece of material to be transmitted/received between a video capture unit 150, a wireless adapter 160, and a client device 170, 175. The communication device 520 may receive a video obtained by a video capture unit 150 in real time or at preset intervals, and may transmit the video to a client device 175. The communication device 520 may receive discussion material from a wireless adapter 160. The received discussion material may be forwarded to the professor station 120 via the input/output device 510, and may be forwarded to each educational station 110 and screen 140 via the input/output device 510 again. In the meantime, the received discussion material may be shared to a client device 175 by the communication device 520.

The communication device 520 may receive a video obtained by each client device 170, 175 and feedback from a client device 170, 175. Further, the communication device 520 may transmit each of the students' degrees of learning determined from the received video and feedback by the learning management unit 550 to the professor station 120 or the professor's terminal (not shown).

The controller 530 controls, on the basis of whether the input/output device 510 and the communication device 520 have received material, the operation of each of the elements 510, 520, 540, and 550. On the basis of whether the input/output device 510 and the communication device 520 have received material, the controller 530 performs control such that the input/output device 510 and the communication device 520 forward the material to an appropriate element as described above, or such that the learning management unit 550 determines each of the students' degrees of learning.

In the meantime, when the input/output device 510 receives a control signal for a discussion mode from the professor station 110, the controller 530 stops transmitting lecture material or other materials to each educational station 110 and performs control such that discussion material received from a client device 170 via a wireless adapter 160 is output to each educational station 110.

The memory 540 stores a video obtained by each client device 170, 175 and feedback that are received by the communication device 520 from a client device 170, 175. The memory 540 stores the video and feedback to enable the learning management unit 550 to determine each of the students' degrees of learning.

Figure 10:
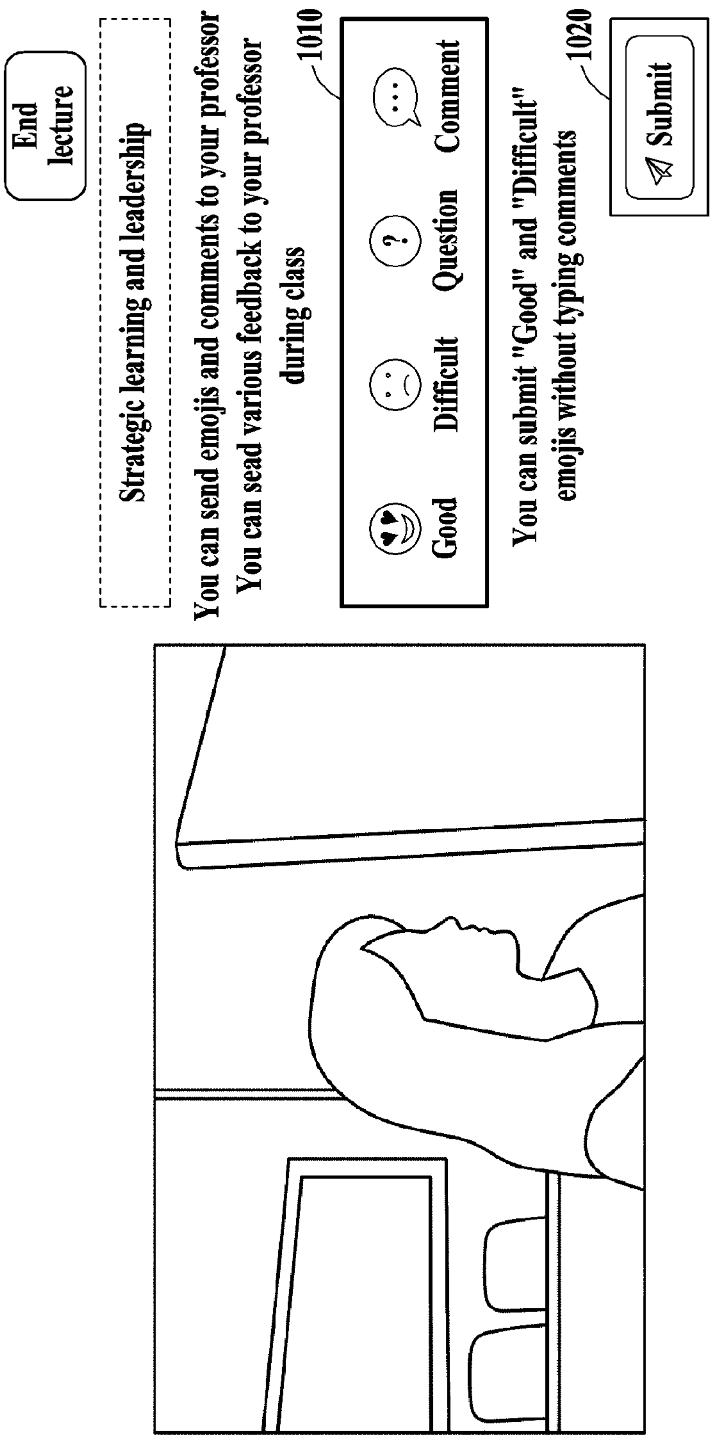
FIG. 10 shows an example of a screen and lecture material output by a learning device.
Figure 12:
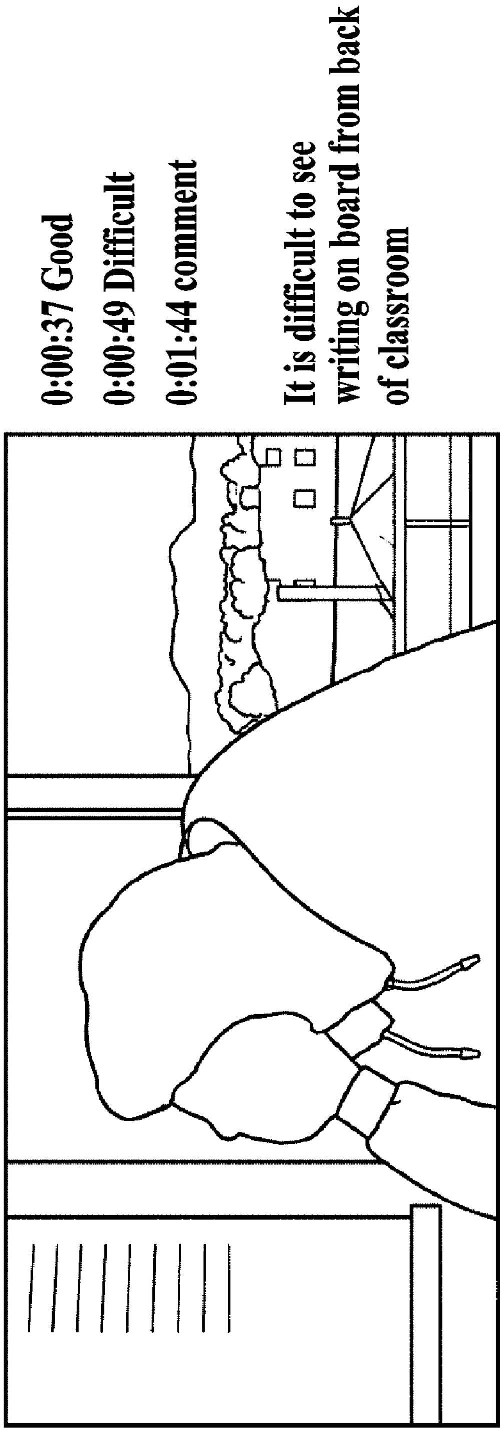
FIG. 12 shows another example of a process in which a professor station manages each of the students' degrees of learning.

The learning management unit 550 determines and manages each learner's degree of learning on the basis of a video and feedback received from a client device 170, 175. As described above, the client device 170, 175 may capture a student, and may receive feedback from a student using an emoji during the lecture, or may receive an opinion on the lecture content during or after the lecture. The learning management unit 550 determines each student's degree of learning on the basis of an obtained video and the feedback or opinion from the student. Examples of this are shown in FIGS. 10 to 12 below.

Figure 6:
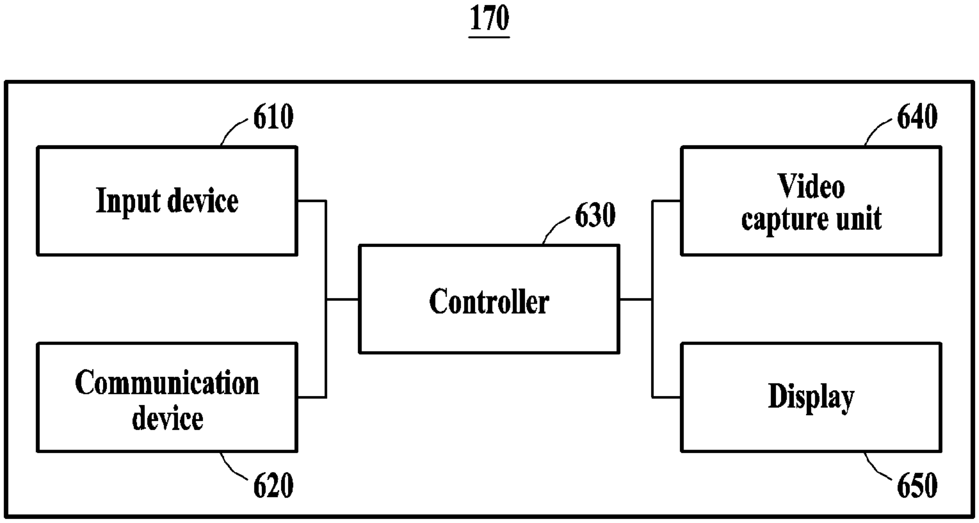
FIG. 6 illustrates an example of a configuration of a learning device.

FIG. 6 shows an example of a configuration of a learning device.

Referring to FIG. 6, a client device 170 according to an embodiment of the present disclosure includes an input device 610, a communication device 620, a controller 630, a video capture unit 640, and a display 650.

The input device 610 receives an emoji or feedback on an opinion from a student.

The communication device 620 is connected to a wireless adapter 160 to transmit feedback or a filmed video. The communication device 620 transmits discussion material, feedback received by the input device 610, or a video of a student obtained by the video capture unit 640, which will be described later, to a wireless adapter 160.

The controller 630 controls the operation of each of the elements 610, 620, 640, and 650.

The video capture unit 640 captures a student within a preset range. In order for the management device 130 to evaluate a student's degree of learning, the video capture unit 640 captures the student independently of the output of material from the display 650.

The display 650 outputs material received by the communication device 620.

Figure 7A:
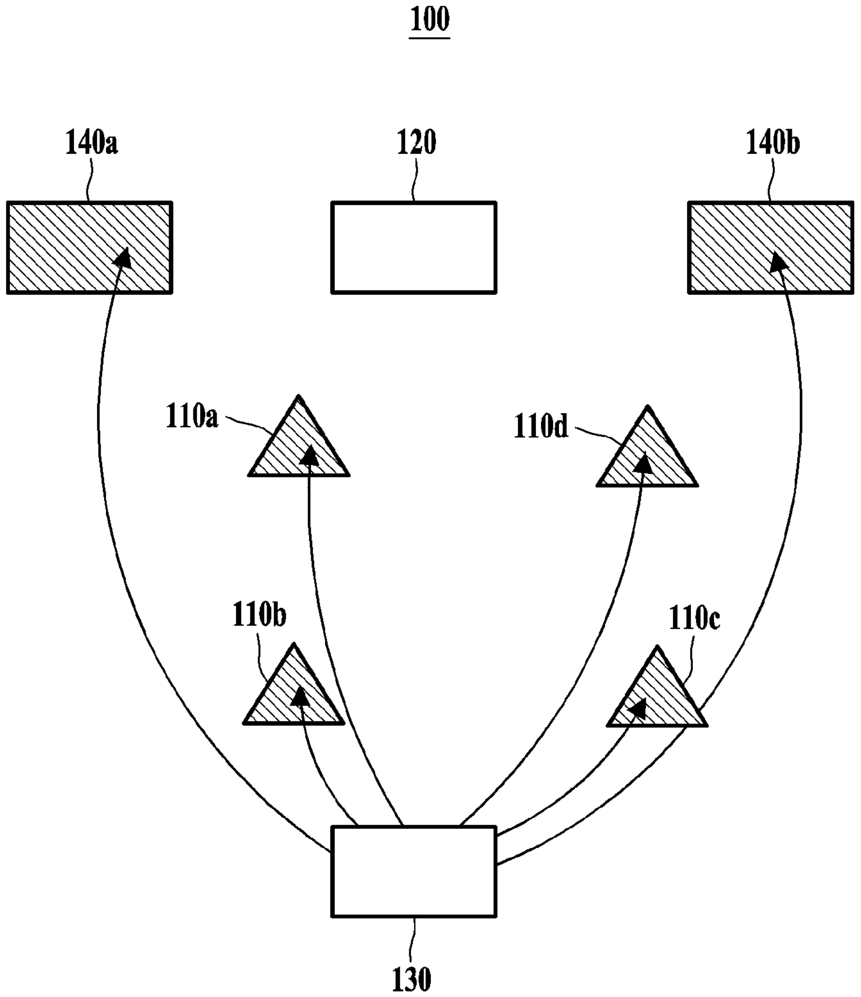
FIGS. 7A-7B illustrate an example of a process in which a professor station forwards lecture material to each element for output.
Figure 7B:
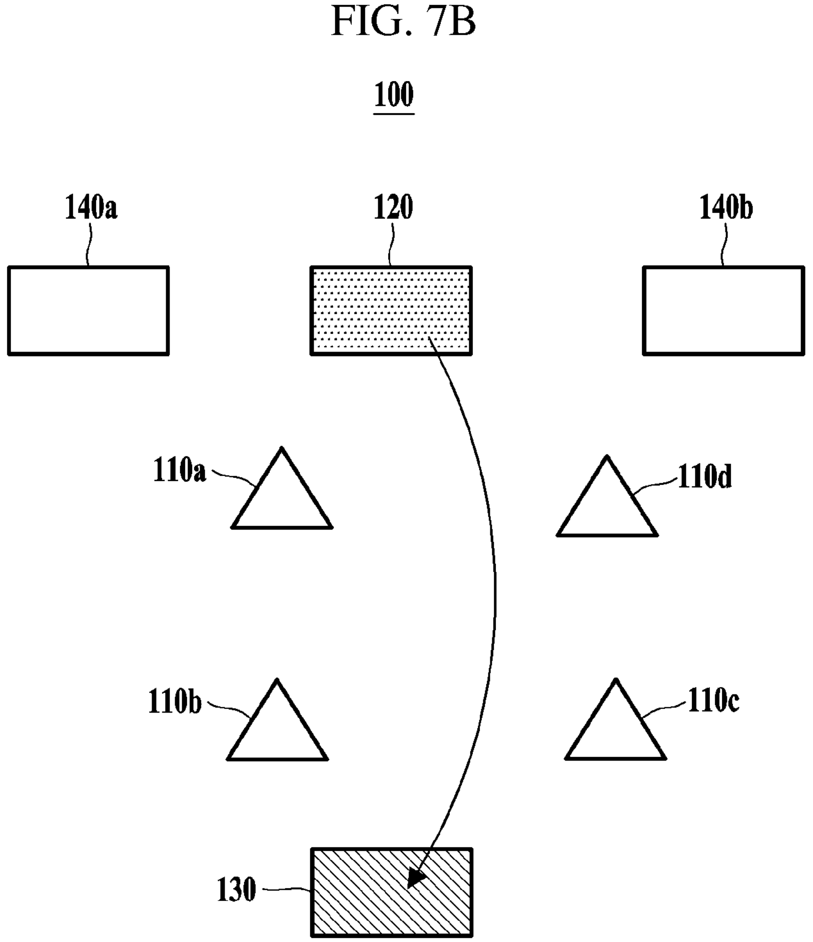

FIGS. 7A-7B illustrate an example of a process in which a professor station forwards lecture material to each element for output.

As shown in FIG. 7A, a professor may need to output material for a lecture that he or she is going to give, or the professor may need to output other materials required for the lecture during the lecture. The professor station 120 outputs lecture material or other materials to the management device 130.

As shown in FIG. 7B, the management device 130 outputs the received lecture material or other materials to each of the educational stations 110*a* to 110*d*, more specifically, the displays 220 within the educational stations and each screen 140. The educational stations 110*a* to 110*d* and the displays 220 output the received material, thus enabling the professor to give the lecture smoothly.

In this case, when transmitting the lecture material or other materials to the educational stations 110, the professor station 120 or the management device 130 may also transmit control signals that cause the displays 220 to be lifted.

Figure 8A:
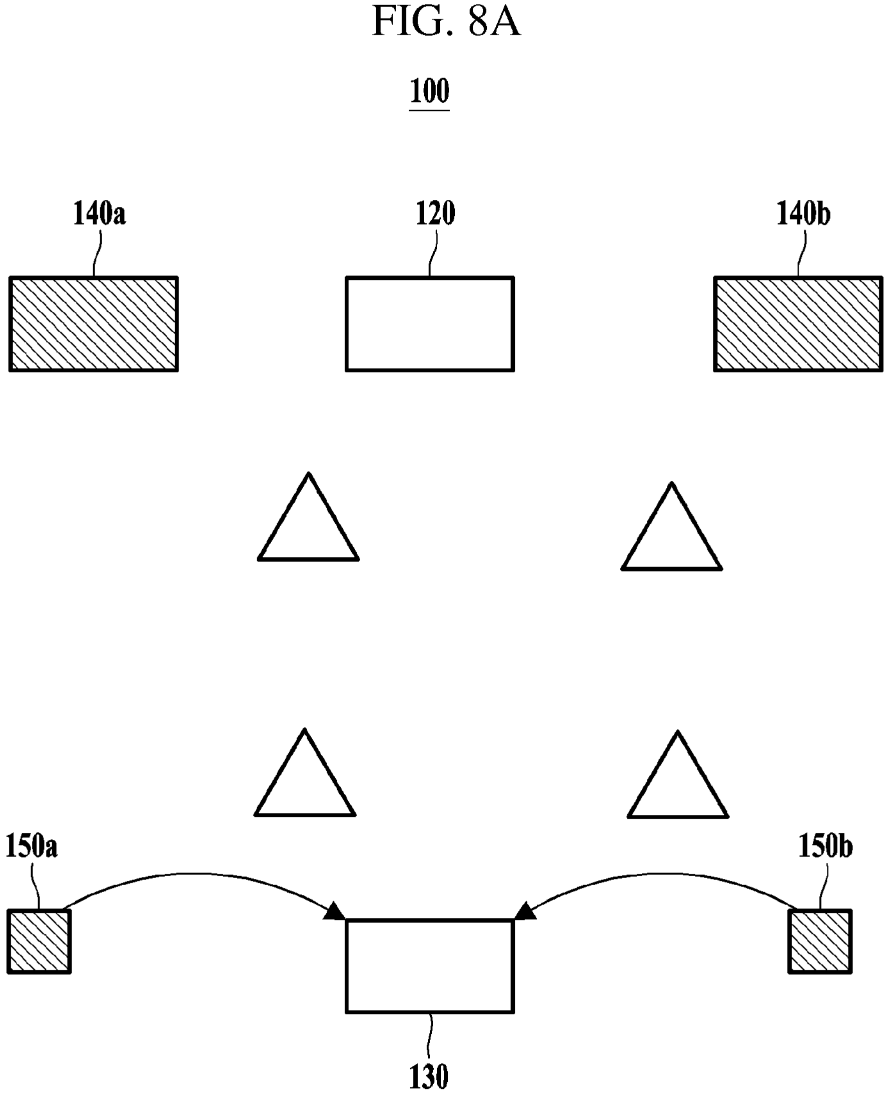
FIGS. 8A-8B illustrate an example of a process in which a management device forwards lecture material remotely.
Figure 8B:
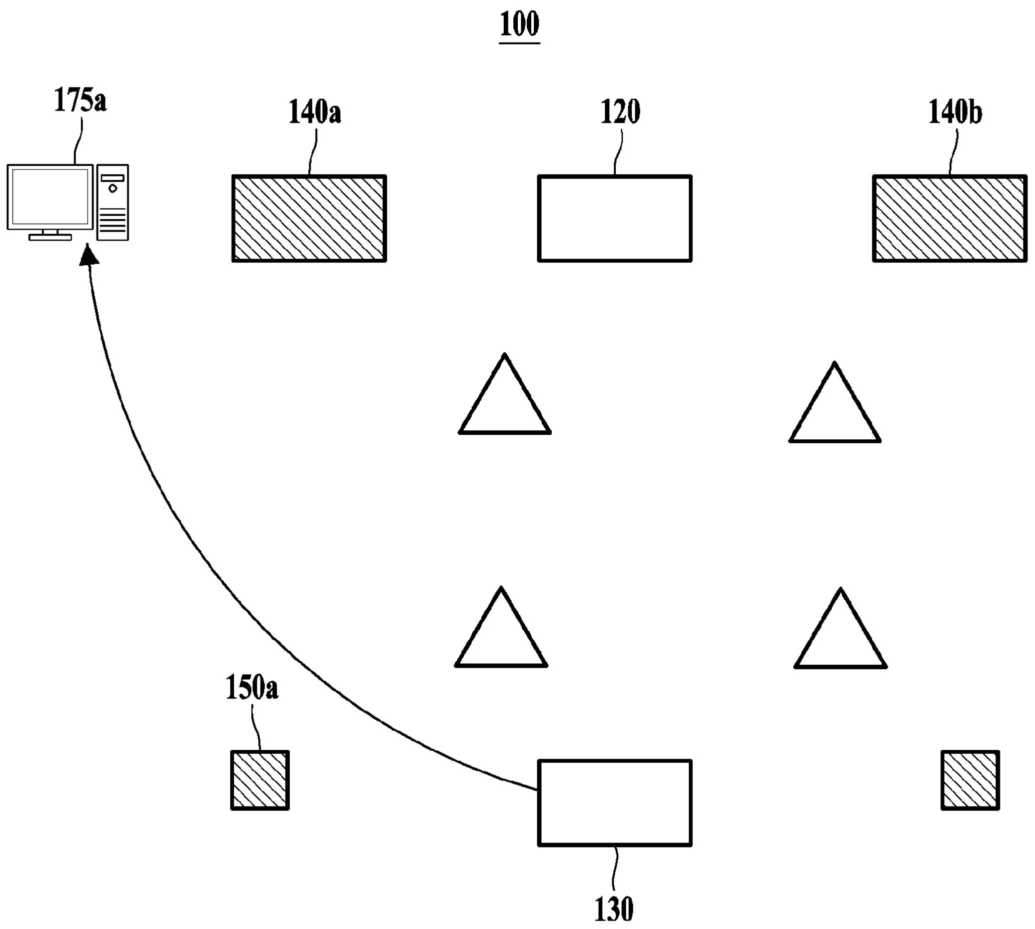

FIGS. 8A-8B illustrate an example of a process in which a management device forwards lecture material remotely.

As shown in FIG. 8A, each screen 140 outputs lecture material or other materials, and a professor may give a lecture. The management device 130 may receive filmed videos from the respective video capture units 150 for capturing the screens 140 and the professor.

As shown in FIG. 8B, the management device 130 may transmit the filmed videos received from the video capture units 150 to each client device 175.

Figure 9A:
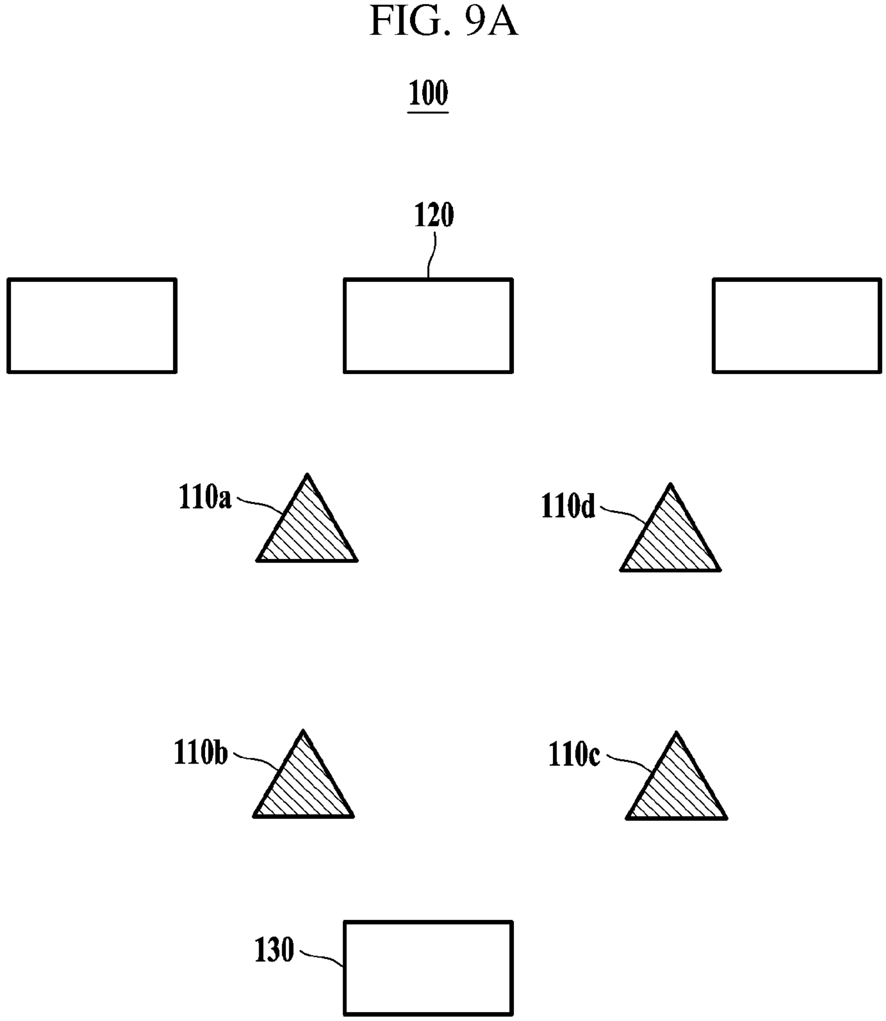
FIG. 9A-9C illustrate an example of a process in which educational stations forward their material to other educational stations or a screen for output.
Figure 9B:
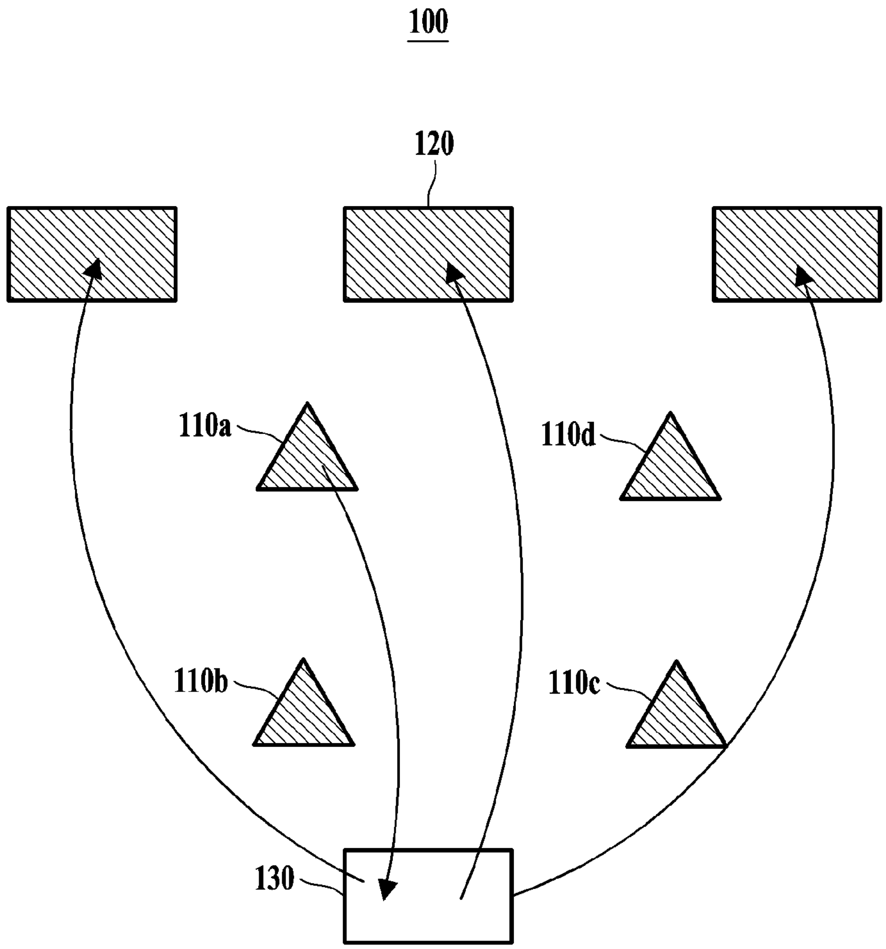
Figure 9C:
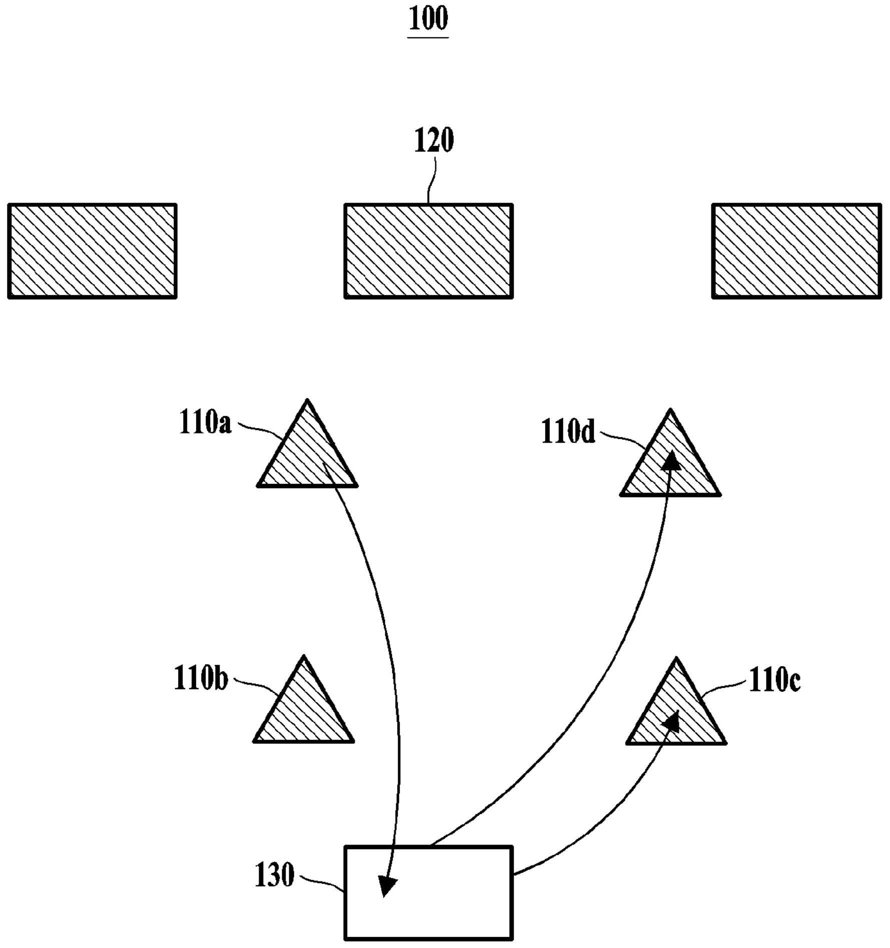

FIGS. 9A-9C illustrate an example of a process in which educational stations forward their material to other educational stations or a screen for output.

Referring to FIG. 9A, when a lecture is completed, when the professor determines that each of the students needs discussion during the lecture, or when the professor receives discussion material from a student (when the professor station 120 receives the discussion material from a client device 170 via a wireless adapter 160), discussion needs to be held rather than the lecture. Accordingly, the professor station 120 transmits a control signal for a discussion mode to the management device 130. When a control signal for a discussion mode is received, the management device 130 stops transmitting lecture material or other materials to each educational station 110 and enables each educational station 110 to receive discussion material from a client device 170 via a wireless adapter 160 and to output the discussion material. Accordingly, each educational station 110 may output discussion material required by each group. The discussion material output from each educational station 110 may vary from station to station, or may be the same for some or all of the stations.

Referring to FIG. 9B, when a student determines that a particular topic or lecture content needs to be discussed by all the students, the educational station 110 to which the student belongs may transmit discussion material to the management device 130. The management device 130 may receive the discussion material and output the same to the professor station 120. When the professor determines that the discussion material needs to be discussed with all the students, the professor station 120 may control the management device 130 to output the discussion material on the screens 140 and the management device 130 may output the discussion material to the screens 140.

Referring to FIG. 9C, simultaneously with or separately from the process shown in FIG. 9B, there may be a case in which a particular student group may have discussion on the discussion material with other student groups. Accordingly, the educational station 110*a* to which a particular student group belongs transmits the discussion material to the management device 130, and the management device 130 transmits the discussion material to the educational stations 110*c* and 110*d* for discussion so that discussion is held among them.

FIG. 10 shows an example of a screen and lecture material output by a learning device. FIGS. 11 and 12 show examples of a process in which a professor station manages each of the students' degrees of learning.

As shown in FIG. 10, learning devices 170, 175 output lecture material or other materials (described later with reference to FIG. 9), and also capture respective students. In outputting lecture material or other materials, the learning devices 170, 175 enable emojis 1010, which may represent the students' feelings about the lecture, and opinions 1020 on the lecture content to be also transmitted (to the management device). The learning devices 170, 175 may transmit these in real time during the lecture.

The learning management unit 550 determines the students' degrees of learning from those. The learning management unit 550 determines the degrees of learning from the students' pupil movements, the students' voices, or the students' movements in the videos received from the respective learning devices 170, 175. It is obvious that the higher the students' degrees of concentration on the lecture, the fewer times their pupils move away from the learning devices 170, 175. In addition, the higher the students' degrees of concentration on the lecture, the more likely the students' movement is to be reduced and the students' voices related to the lecture content occur. Based on this, the learning management unit 550 determines the students' degrees of learning in the videos from how much each student's pupils move away from the learning devices 170, 175, how much movement there is, and how much each student makes voice (related to the lecture content) during the lecture.

In addition, the learning management unit 550 determines the degrees of learning on the basis of how many emojis each of the students submits during the lecture and how many opinions each of the students submits.

Putting the aforementioned determinations together, the learning management unit 550 may manage the overall degree of learning by analyzing the number of pieces of feedback and the participation rates of the respective students as shown in FIGS. 11 and 12.

In addition, the learning management unit 550 may put together the time points when emojis or opinions about the lecture are received from the students. Depending on the lecture content, there may be a time point at which it is difficult for all the students to understand or follow the lecture content well. At the time point, many opinions (about questions) or emojis (about questions) may be received from the students. Conversely, at a time point at which it is easy for the students to understand, relatively many emojis (about positive reviews) may be received. As described above, the learning management unit 550 may analyze statistics on how many emojis or opinions have been received at each time point, and what types of emojis or opinions have been received. The communication device 520 forwards the analyzed statistics to the professor station 120 or the professor's terminal (not shown), so that the professor is able to understand the analysis of his or her lecture or the students' degrees of understanding about particular lecture content.

The above description is merely an exemplary description of the technical idea of the embodiments of the present disclosure, and those skill in the art will appreciate that various modifications and changes are possible, without departing from the essential features of the embodiments of the present disclosure. Accordingly, these embodiments of the present disclosure are illustrative and not intended to limit the technical idea of the embodiments of the present disclosure, and the scope of the technical idea of the embodiments of the present disclosure is not limited by the embodiments. The scope of protection of the embodiments of the present disclosure should be interpreted by the claims below, and all technical ideas within the scope equivalent thereto should be interpreted to be included in the scope of the embodiments of the present disclosure.

What is claimed is:

1. A learning support system including a station for group learning, the learning support system comprising:

an educational station configured to receive and output a professor's lecture material, or configured to receive and output discussion material, the educational station comprising:

an input device configured to receive the lecture material or the discussion material;

a display configured to output the received material;

support configured to support the display; and a lifting/lowering device configured to lift or lower the display;

a screen placed at a preset location in a lecture room, and configured to output material forwarded from outside;

a professor station configured to forward the lecture material to the educational station or the screen, or configured to output the lecture material or the discussion material for the professor to recognize;

a client device configured to receive and output the lecture material, or configured to transmit the discussion material input by a student;

a camera configured to capture the student; and a management device configured to perform wired or wireless communication with the educational station, the screen, the professor station, and the learning device, and configured to enable material to be forwarded, wherein the management device is configured to analyze a degree of learning or a degree of concentration of the student based on feedback on the lecture material from the client device and a video of the student obtained by the camera, and wherein the degree of learning or the degree of concentration is determined based on how much the student's pupils move away from the client device in the video, how much movement of the student occurs in the video, and how much the student's voice related to the lecture content occurs in the video.

2. The learning support system of claim 1, wherein the management device performs control such that the educational station and the screen output the lecture material.

3. The learning support system of claim 1, further comprising a wireless adapter configured to enable wireless communication to be performed between the client device and the management device.

4. The learning support system of claim 3, wherein the management device is configured to forward the discussion material received from the wireless adapter to at least one selected from a group of the educational station, the professor station, and the screen.

5. The learning support system of claim 1, wherein the management device comprises:

an input/output device configured to forward material to the professor station, the educational station, or the screen, or configured to receive a control signal for a discussion mode or a lecture mode from the professor station;

a communication device configured to receive the discussion material from the educational station; and a controller configured to control the input/output device such that material is received from the professor station and is forwarded to the educational station when the control signal for the lecture mode is received, or configured to perform control such that each educational station outputs the discussion material when the control signal for the discussion mode is received.

6. The learning support system of claim 1, wherein the management device comprises a learning management unit configured to determine degrees of learning of the students on the basis of movements of pupils of the respective students, voices of the students, or movements of the students in a video received from the client device.

7. The learning support system of claim 1, wherein the client device is configured to transmit, to the management device, emojis capable of representing the students' feelings about a lecture and opinions on lecture content.

8. The learning support system of claim 7, wherein the management device is configured to aggregate time points at which the emojis are received from the students and to analyze statistics regarding an amount and types of the emojis at each of the time points.

9. The learning support system of claim 7, wherein the management device is configured to aggregate time points at which the opinions are received from the students and to analyze statistics regarding an amount and types of the opinions at each of the time points.

10. The learning support system of claim 9, wherein the management device comprises a communication device configured to forward the statistics to the professor station.

11. The learning support system of claim 7, wherein the emojis include icons corresponding to the words "good" and "difficult".

12. The learning support system of claim 1, wherein the management device comprises a learning management unit configured to determine degrees of learning of the students on the basis of frequencies of occurrence of voices related to lecture content that are generated by the students in a video received from the client device.

* * * * *